(12) United States Patent
Woodruff et al.

(10) Patent No.: US 11,235,521 B2
(45) Date of Patent: Feb. 1, 2022

(54) 3-D PRINTING

(71) Applicant: HEWLETT-PACKARD DEVELOPMENT COMPANY, L.P., Spring, TX (US)

(72) Inventors: Shannon Reuben Woodruff, San Diego, CA (US); Ali Emamjomeh, San Diego, CA (US); Yi Feng, San Diego, CA (US); Erica Fung, San Diego, CA (US); Carolin Fleischmann, San Diego, CA (US); Geoffrey Schmid, San Diego, CA (US)

(73) Assignee: Hewlett-Packard Development, L.P., Spring, TX (US)

( * ) Notice: Subject to any disclaimer, the term of this patent is extended or adjusted under 35 U.S.C. 154(b) by 819 days.

(21) Appl. No.: 16/077,752

(22) PCT Filed: Jul. 14, 2017

(86) PCT No.: PCT/US2017/042098
§ 371 (c)(1),
(2) Date: Aug. 14, 2018

(87) PCT Pub. No.: WO2019/013814
PCT Pub. Date: Jan. 17, 2019

(65) Prior Publication Data
US 2021/0197455 A1    Jul. 1, 2021

(51) Int. Cl.
*B29C 64/165*    (2017.01)
*B33Y 70/00*    (2020.01)
*B33Y 10/00*    (2015.01)
*B29K 67/00*    (2006.01)
*B29K 77/00*    (2006.01)

(52) U.S. Cl.
CPC ............ *B29C 64/165* (2017.08); *B33Y 70/00* (2014.12); *B29K 2067/04* (2013.01); *B29K 2077/00* (2013.01); *B33Y 10/00* (2014.12)

(58) Field of Classification Search
CPC .... B29C 64/165; B29K 2077/00; B33Y 70/00
See application file for complete search history.

(56) References Cited

U.S. PATENT DOCUMENTS

| | | | |
|---|---|---|---|
| 9,255,176 B2 | 2/2016 | Wang et al. | |
| 9,402,710 B2 | 8/2016 | Yang et al. | |
| 9,453,099 B2 | 9/2016 | Zhang et al. | |
| 9,598,606 B2 | 3/2017 | Rolland et al. | |
| 2013/0136924 A1 | 5/2013 | Ikuta et al. | |

(Continued)

FOREIGN PATENT DOCUMENTS

| | | |
|---|---|---|
| CN | 103842157 | 6/2014 |
| CN | 106626380 | 5/2017 |
| CN | 106750142 | 5/2017 |

(Continued)

*Primary Examiner* — James Sanders
(74) *Attorney, Agent, or Firm* — HPI Patent Department (57) ABSTRACT

This disclosure relates to a method of 3-D printing comprising: applying a layer of build material onto a print platform, wherein the build material comprises particles of a polymer comprising polymer chains having at least one reactive group that is protected with a protecting group; printing a de-protecting agent at selected locations on the layer of build material; and coalescing particles of the polymer at the printed locations on the layer of build material to form a coalesced polymer layer.

13 Claims, 2 Drawing Sheets

(56) References Cited

U.S. PATENT DOCUMENTS

2017/0120515 A1   5/2017  Rolland et al.
2017/0173872 A1   6/2017  McCall et al.

FOREIGN PATENT DOCUMENTS

| EP | 2660255 A1 | 11/2013 |
|---|---|---|
| JP | 03000754 | 1/1991 |
| WO | 2007042230 A1 | 4/2007 |
| WO | WO-2015158718 | 10/2015 |
| WO | WO-2016063282 | 4/2016 |
| WO | 2016068899 A1 | 5/2016 |
| WO | 2017065796 A1 | 4/2017 |

3-D PRINTING

BACKGROUND 3-dimensional (3D) printing or additive manufacturing refers to a printing process in which successive layers of material are formed under computer control to create an object. Various methods of 3D printing have been developed, including heat-assisted extrusion, selective laser sintering (SLS), fused deposition modelling (FDM), high speed sintering (HSS) and photolithography.

BRIEF DESCRIPTION OF THE DRAWINGS

Various features will be described, by way of example only, with reference to the following figures, in which.

DETAILED DESCRIPTION

It is to be understood that this disclosure is not limited to the particular process steps and materials disclosed herein because such process steps and materials may vary. It is also to be understood that the terminology used in this disclosure is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural forms unless the context clearly dictates otherwise.

As used herein, "liquid vehicle" or "ink vehicle" refers to a liquid in which additive is placed to form an inkjet composition. A wide variety of liquid vehicles may be used with the systems and methods of the present disclosure. A variety of different agents, including, surfactants, solvents, co-solvents, anti-kogation agents, buffers, biocides, sequestering agents, viscosity modifiers, and surface-active agents may be dispersed or dissolved in the liquid vehicle.

The term "fusing agent" is used herein to describe agents that may be applied to particulate build material, and which may assist in fusing the build material to form a layer of a 3D part. Heat may be used to fuse the build material, but the fusing agent can also assist in binding powder together, and/or in generating heat from electromagnetic energy. For example, a fusing composition may include a fusing agent that can bind the build material together in preparation for heating to fuse the materials together, or may be an additive that becomes energized or heated when exposed to a frequency or frequencies of electromagnetic radiation. Any additive that assists in fusing particulate build material to form the 3D printed part can be used.

As used herein, "jet," "jettable," "jetting," or the like refers to compositions that are ejected from jetting architecture, such as inkjet architecture. Inkjet architecture can include thermal or piezo drop on demand architecture, as well as continuous inkjet architecture. Additionally, such architecture can be configured to print varying drop sizes, for example, less than 50 picolitres (pl), less than 40 pl, less than 30 pl, less than 20 pl, less than 10 pl. In some examples, the drop size may be 1 to 40 pl, for example, 3 or 5 to 30 pl.

As used herein, the term "substantial" or "substantially" when used with reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "print platform" refers to a platform onto which build material is applied during the 3-D printing process. The print platform may comprise a supporting substrate. At the start of the 3-D printing process, the print platform may comprise a substantially clean supporting substrate. However, after the first coalescing step, a coalesced polymer layer of build material may be formed on the print platform. Thus, the print platform may comprise a supporting substrate or a supporting substrate comprising a previously formed coalesced polymer layer of build material.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

The present disclosure relates to a method of 3-D printing comprising:

a) applying a layer of build material onto a print platform, wherein the build material comprises particles of a polymer comprising polymer chains having at least one reactive group that is protected with a protecting group, b) printing a de-protecting agent at selected locations on the layer of build material, and c) coalescing particles of the polymer at the printed locations on the layer of build material to form a coalesced polymer layer.

In some examples, the method further comprises d) separating particles of the polymer from the coalesced polymer layer, e) applying at least some of the separated particles over the coalesced polymer layer as a further layer of build material, f) printing de-protecting agent at selected locations on the further layer of build material, g) coalescing particles of the polymer at the printed locations on the further layer of build material to form a further coalesced polymer layer; and h) optionally repeating steps d) to g).

The present disclosure also relates to a build material for 3-D printing comprising particles of a polymer comprising polymer chains having at least one reactive group that is capped with a protecting group. The build material may comprise particles of a polymer comprising polymer chains having at least one terminal reactive group that is protected with a protecting group.

In a further aspect, the present disclosure also relates to an inkjet composition comprising a de-protecting agent for de-protecting a protected amino, protected hydroxyl, and/or protected carboxyl, and water.

In yet a further aspect, the present disclosure relates to material set comprising a build material for 3-D printing comprising particles of a polymer comprising polymer chains having at least one reactive group that is capped with a protecting group, and an inkjet composition comprising a de-protecting agent and water.

Build material for 3-D printing comprises particles of a polymer comprising polymer chains having at least one reactive group. The reactive group may be a terminal group and/or a side group. When the build material is heated, for example during 3-D printing, the reactive groups of the polymer chains may react, causing the polymer chains to react (e.g. polymerise). For example, in the case of a polyamide, an amino group of one polymer chain may react with a carboxyl group of another polymer chain e.g. in a condensation reaction. This may cause the polymer chains to react, increasing the molecular weight of the polymer. Furthermore, as the polymer coalesces (e.g. by softening or melting) during the 3-D printing process, the polymer chains may intertwine in a process called reptation. Polymerisation and reptation can affect the mechanical properties of the polymer and resulting printed part. Indeed, insufficient or inconsistent reptation and/or polymerisation can have a negative effect on the mechanical properties of the resulting printed part.

In 3-D printing, a layer of build material may be applied to a print platform. Heat is directed at selected locations on the layer of build material to coalesce the build material at the selected locations. In this way, a coalesced polymer layer is produced. A further layer of build material may be applied to the previously formed coalesced polymer layer. When heat is applied to selected locations of the further layer of build material, a further coalesced polymer layer may be formed on top of the previous layer. The process may be repeated until the printed part is complete.

Any un-coalesced polymer particles remaining after the coalescing step may be separated from the coalesced polymer layer and re-used in subsequent printing steps. For example, the polymer particles may be separated from a coalesced polymer layer and re-used to form subsequent coalesced polymer layers.

It has been found, however, that, while the separated build material may remain in particulate form, the elevated temperatures encountered on the print platform may cause some of the polymer chains in the build material to react. Moreover, although heat may be directed at specific locations on the layer of build material, polymer particles at adjacent locations may also be exposed to heat. While this exposure to elevated temperatures may not cause the particles to coalesce, the heat may be sufficient to initiate reaction (e.g. polymerisation or crosslinking) of the polymer chains, causing the molecular weight of the polymer in the adjacent locations to increase. This increase in molecular weight may affect the polymer's ability to reptate and/or further polymerise in subsequent coalescing steps. This can affect the mechanical properties of the printed part and create anisotropy within the final structure.

By protecting at least some of the reactive groups of the polymer chains, it may be possible to reduce the risk of premature reaction (e.g. polymerisation). By applying a de-protecting agent to selected locations on the layer of build material, it may be possible to target (e.g. digitally) the specific locations where reaction (e.g. polymerisation or crosslinking) can occur. By directing heat to the polymer at these specific locations during the coalescing step, reptation may also be targeted at these specific locations. The polymer particles adjacent to these selected locations remains protected and can remain resistant to reaction (e.g. polymerisation), for example, when heat is applied to the selected locations during the subsequent coalescing step. As a result, the polymer at these adjacent locations may be less likely to increase in molecular weight prematurely. This, in turn, may reduce the risk of the mechanical properties of the printed polymer being compromised, for example, as a result of insufficient or inconsistent reptation and/or polymerisation during the coalescing steps.

Build Material

As mentioned above, the build material polymer comprises polymer chains having at least one reactive group that is capped (or protected) with a protecting group. The reactive group may be a terminal group and/or a side group. The reactive group may comprise at least one amino, carboxyl and/or hydroxyl group that is capped with a protecting group. In some examples, the reactive group comprises an amino group, hydroxyl and/or a carboxyl group. In some examples, the reactive group may be an amide group that comprises an amino group that is capped with a protecting group. In some examples, the reactive group may be a carboxylic acid group that comprises a carboxyl group that is capped with a protecting group. In some examples, the reactive group is a hydroxyl group that is capped with a protecting group.

Where the reactive group comprises a protected amino group, the protecting group may be independently selected from —$C(O)OC_1$-$C_6$-alkyl, optionally substituted —$C(O)OCH_2$-aryl, —$C(O)$—O-allyl, —$C(O)$—O—$CH_2$-fluorenyl, optionally substituted —$CH(aryl)_3$, optionally substituted —($C_1$-$C_3$-alkylene)-aryl, optionally substituted —$C(O)$—$C_1$-$C_6$-alkyl, optionally substituted —$C(O)aryl$, —$S(O)_2$—$C_1$-$C_6$-alkyl, optionally substituted —$S(O)_2$-aryl and optionally substituted —$Si(C_{1-6}alkyl)_3$.

Where the reactive group comprises a protected carboxyl group, the protecting group may be independently selected from optionally substituted —O—$C_1$-$C_6$ alkyl, optionally substituted —O—($C_1$-$C_3$-alkylene)-aryl, and optionally substituted —S—$C_1$-$C_6$ alkyl.

Where the reactive group comprises a protected hydroxyl group, the protecting group may be independently selected from optionally substituted —$Si(C_{1-6}alkyl)_3$, optionally substituted —$C(O)$—$C_1$-$C_6$-alkyl, optionally substituted —$C(O)$-aryl, optionally substituted —$C(O)$—$OC_1$-$C_6$-alkyl, —$C(O)$—O-allyl, —$C(O)$—O—$CH_2$-fluorenyl, optionally substituted —$CH(aryl)_3$, optionally substituted —($C_1$-$C_3$-alkylene)-aryl, optionally substituted —$C(O)OCH_2$-aryl and optionally substituted —$C_1$-$C_4$-alkyl-O—$C_1$-$C_4$-alkyl.

Any of the alkyl, allyl and aryl groups mentioned above may be optionally substituted by 1 to 3 substituents which are each independently and at each occurrence selected from the group consisting of oxo, =NR$^a$, =NOR$^a$, halo, nitro, cyano, NR$^a$R$^a$, NR$^a$S(O)$_2$R$^a$, NR$^a$CONR$^a$R$^a$, NR$^a$CO$_2$R$^a$, OR$^a$; SR$^a$, SOR$^a$, SO$_3$R$^a$, SO$_2$R$^a$, SO$_2$NR$^a$R$^a$, CO$_2$R$^a$ C(O)R$^a$, CONR$^a$R$^a$, C$_1$-C$_4$-alkyl, C$_2$-C$_4$-alkenyl, C$_2$-C$_4$-alkenyl, and C$_1$-C$_4$ haloalkyl; wherein R$^a$ is independently at each occurrence selected from H, C$_1$-C$_4$ alkyl and C$_1$-C$_4$ haloalkyl.

The —Si(C$_{1-6}$alkyl)$_3$ group may be a —Si(C$_{1-4}$alkyl)$_3$ group. Examples may include triethylsilyl and t-butyl-dimethylsilyl.

The —C(O)—C$_1$-C$_6$-alkyl may be a —C(O)—C$_1$-C$_3$-alkyl group. Examples may include acetyl and propionyl.

The —C(O)-aryl group may be a —C(O)-phenyl group. Examples may include benzoyl.

The optionally substituted —C(O)—OC$_1$-C$_6$-alkyl group may be a —C(O)—OC$_1$-C$_4$-alkyl group. An example may be —C(O)OtBu.

The optionally substituted —(C$_1$-C$_3$-alkylene)-aryl group may be an optionally substituted benzyl group. Examples may include benzyl, phenethyl, 4-methoxy benzyl, 4-nitrobenzyl, 4-bromobenzyl, 2,3-dimethoxybenzyl and 2,4-dimethoxybenzyl.

The optionally substituted —C(O)OCH$_2$-aryl group may be an optionally substituted —C(O)O-benzyl group. Examples may include —C(O)O-benzyl and —C(O)O-(4-methoxybenzyl).

The optionally substituted —C$_1$-C$_4$-alkyl-O—C$_1$-C$_4$-alkyl group may be a —C$_1$-C$_4$-alkyl-O—C$_1$-C$_2$-alkyl group. Examples may include methoxy-methyl (MOM) and 2-methoxy-ethoxy-methyl (MEM).

The optionally substituted —S(O)$_2$—C$_1$-C$_6$-alkyl group may be a —S(O)$_2$C$_1$-C$_4$-alkyl group. An example may be methanesulfonate.

The optionally substituted —S(O)$_2$-aryl group may be a —S(O)$_2$-phenyl group. Examples may include phenylsulfonate, 4-methylphenylsulfonate and 4-nitro phenylsulfonate.

The optionally substituted —CH(aryl)$_3$ group may be a —CH(phenyl)$_3$ group. An example may be trityl.

Where the reactive group comprises a protected amino group, the protecting group may be selected from:

where the dotted bond(s) in each instance represent bonds to the nitrogen atom of the amino group.

The protected form of the amino group may be selected from at least one of the following groups: 9-fluorenylmethyl carbamate, t-butyl carbamate, benzyl carbamate, acetamide, trifluoroacetamide, phthalimide, benzylamine, triphenylmethylamine, benzylideneamine, p-toluenesulfonamide.

Where the reactive group comprises a protected carboxyl group, the protecting group may be selected from at least one of:

where the dotted bond(s) in each instance represent bonds to the carbonyl group of the carboxyl group.

The protected form of the carboxyl group may be selected from methyl ester, t-butyl ester, benzyl ester, S-t-butyl ester and 2-alkyl-1,3-oxazoline.

Where the reactive group comprises a protected hydroxyl group, the protecting group may be selected from at least one of where the dotted bond(s) in each instance represent bonds to the oxygen atom of the hydroxyl group.

The protected hydroxyl group may be selected from methoxymethyl ether (MOM-OR), tetrahydropyranyl ether (THP-OR), t-butyl ether, allyl ether, benzyl ether, t-butyldimethylsilyl ether, t-butyldiphenylsilyl ether, acetic acid ester, pivalic acid ester and benzoic acid ester.

The protecting groups can typically be added and removed using conventional protecting group methodology, for example, as described in "Protective Groups in Organic Chemistry," edited by J W F McOmie (1973); "Protective Groups in Organic Synthesis," 2$^{nd}$ edition, T W Greene (1991); and "Protecting Groups", 3$^{rd}$ addition P. J Koscienski (1995).

Where a protecting group is acid sensitive, the deprotection step can be conducted using a suitable acid or acid chloride. The acid may be a Bronsted acid (e.g. trifluoroacetic acid (TFA), phosphoric acid, HCl, or formic acid) or a Lewis acid (e.g. $ZnBr_2$, $CeCl_3$). Examples of acid sensitive protecting groups may include trityl, C(O)OtBu, MOM, MEM, 2,4-dimethoxybenzyl and 2,3-dimethoxybenzyl.

Where a protecting group is base sensitive, the deprotection step can be conducted using a suitable base. Examples of suitable base sensitive protecting groups include acetyl and benzoyl. Suitable bases include $NH_3$, amines or aqueous hydroxides (e.g. NaOH). Suitable amines include primary, secondary or tertiary amines. The amines may be aliphatic, aromatic or cyclic amines. Examples of suitable amines include piperidine and ethylene diamine.

Where a protecting group is a silyl group (e.g. triethylsilyl or t-butyldimethylsilyl, the deprotection step can be conducted using a suitable acid (e.g., TFA) or using a suitable fluorine source (e.g. tetrabutylammonium fluoride, fluorosilicic acid, HF).

Where a protecting group is —C(O)—O—$CH_2$-fluorenyl, the deprotection step can be performed using piperidine.

The build material comprises polymer particles or powder, for example, thermoplastic polymer particles or powder. The build material may alternatively comprise polymer particles or powder, for example, thermoset polymer particles or powder.

In some examples, the build material comprises polymer chains having at least one terminal reactive group that is protected with a protecting group.

Alternatively, the polymer chains may have at least one reactive side group. These side groups can be activated on demand by application of the de-protecting agent. For example, where the polymer chains have at least two reactive side groups, the side groups can be activated on demand to allow subsequent crosslinking reactions to occur. Since the degree of cross-linking may be determined by the amount of available reactive groups, crosslinking controlled by the amount of deprotecting agent that is jetted onto a certain area. Thus, it may be possible to control the degree of cross-linking spatially controlled throughout the printed part. In some examples, crosslinking can help to improve the mechanical properties (e.g. strength and/or elasticity) of the printed part. Accordingly, it may be possible to spatially control the mechanical properties of the printed part at a voxel level by targeted application of de-protecting agent.

The particles of the build material may have an average particle size from 10 to 100 μm, for example, 20 to 80 μm. As used in the present disclosure, "average" with respect to properties of particles refers to a number average unless otherwise specified. Accordingly, "average particle size" refers to a number average particle size. Additionally, "particle size" refers to the diameter of spherical particles, or to the longest dimension of non-spherical particles. Particle size may be determined by, for example, dynamic laser scattering or laser diffraction spectroscopy. An example of a commercially available instrument suitable for determining particle size may be Mastersizer® by Malvern® Instruments.

The particle size distribution of the polymer may be as follows: D50 can be from 45 microns to 75 microns, from 55 microns to 65 microns, or about 60 microns; D10 can be from 10 microns to 50 microns, from 30 microns to 40 microns, or about 35 microns; and D90 can be from 75 microns to 150 microns, from 80 microns to 95 microns, or about 90 microns. "D50" is defined as the median weight. "D10" is defined as the tenth-percentile by weight of polymer that is below a given particle size, e.g., from 20 microns to 50 microns. "D90" is defined as the ninetieth-percentile by weight of polymer that is below a given particle size, e.g., 75 microns to 100 microns.

In certain examples, the polymer particles can have a variety of shapes, such as substantially spherical particles or irregularly-shaped particles. In some examples, the polymer particles can be capable of being formed into 3D printed parts with a resolution of 10 to 100 μm, for example 20 to 80 μm. As used herein, "resolution" refers to the size of the smallest feature that can be formed on a 3D printed part. The polymer particles can form layers from about 10 to about 100 μm thick, allowing the fused layers of the printed part to have roughly the same thickness. This can provide a resolution in the z-axis direction of about 10 to about 100 μm. The polymer particles can also have a sufficiently small particle size and sufficiently regular particle shape to provide about 10 to 100 μm resolution along the x-axis and y-axis.

In some examples, the polymer particles can be colorless. For example, the polymer powder can have a white, translucent, or transparent appearance. When used, for example, with a colorless fusing composition, such polymer particles can provide a printed part that is white, translucent, or transparent. In other examples, the polymer particles can be coloured for producing coloured parts. In still other examples, when the polymer powder is white, translucent, or transparent, color can be imparted to the part by the fusing ink or another coloured ink.

The polymer particles can have a melting or softening point from about 70° C. to about 350° C. or 400° C. In further examples, the polymer can have a melting or softening point from about 150° C. to about 200° C. A variety of polymers with melting points or softening points in these ranges can be used. For example, the polymer can be nylon 6 powder, nylon 9 powder, nylon 11 powder, nylon 12 powder, nylon 66 powder, nylon 612 powder, polyethylene powder, thermoplastic polyurethane powder, polypropylene powder, polyester powder, polycarbonate powder, polyether ketone powder, polyacrylate powder, polystyrene powder, or combinations thereof.

In one example, the polymer may be a polyamide. A suitable polyamide may have the formula $[(CH_2)_{11}C(O)NH]_n$. The polymer may be made from w-aminolauric acid or laurolactam monomers that each have 12 carbons.

In a specific example, the polymer powder can be nylon 12, which can have a melting point from about 175° C. to about 200° C. In another specific example, the polymer can be thermoplastic polyurethane. In another example, the polymer is a polyester.

The polymer particles can also in some cases be blended with a filler. The filler can include inorganic particles such as alumina, silica, or combinations thereof. When the particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer powder to filler particles can be from 10:1 to 1:2 or from 5:1 to 1:1.

The molecular weight of the polymer of the build material may range from 5 to 150 kDa. In some examples, the polymer of the build material may have a molecular weight in the range of 10 to 130 kDa, for example, 20 to 120 kDa or 30 to 110 kDa. In some examples, the polymer of the build material may have a molecular weight in the range of 40 to 100 kDa, for example, 50 to 80 kDa. In some examples, the polymer of the build material may have a molecular weight that is less than 70 kDa, for example, less than 60 kDa.

De-Protecting Agent

As described above, an inkjet de-protecting composition may be applied to the polymer particles of the layer of build material. The ink-jet de-protecting composition may be applied digitally drop-by-drop at selected locations of the layer of build material. Each drop may contain less than 50 picolitres (pl), less than 40 pl, less than 30 pl, less than 20 pl, less than 10 pl. In some examples, the drop size may be 1 to 40 pl, for example, 3 to 30 or 5 to 20 pl. The small drop size may allow de-protection to occur at high resolution across the layer of build material.

When the de-protecting composition is applied, the de-protecting agent contained in the composition may react with the polymer of the build material to remove the protecting groups from the reactive groups on the polymer chains. The heat of the printing process may help to catalyse the reaction. In some examples, the additional heat applied to the printed locations of the layer of build material during the coalescing step may also catalyse the reaction.

Any suitable de-protecting agent may be employed. In some examples, the de-protecting agent may be any agent suitable for deprotecting a protected amino, carboxyl, carbonyl or hydroxyl group. In some examples, de-protecting agent may be any agent suitable for deprotecting a protected amino, carboxyl or hydroxyl group. Suitable de-protecting agents include acids, acid chlorides and bases. Suitable acids include trifluoroacetic acid, phosphoric acid, hydrochloric acid and carboxylic acids, for example, formic and acetic acid. Suitable acid chlorides include acetyl chloride. Suitable bases include aqueous alkali metal hydroxides (e.g. NaOH, KOH), ammonia and primary, secondary, and tertiary amines. Examples of suitable amines include piperidine and ethylene diamine. Other suitable Lewis bases and/or nucleophiles may also be employed.

In one example, the de-protecting agent is acetyl chloride.

In one example, the de-protecting agent is piperidine or ethylene diamine.

The de-protecting agent may be present in the de-protecting composition in an amount of 0.1 to 40 weight %, for example, 0.5 to 30 weight %. In some examples, the de-protecting agent may be present in an amount of 1 to 20 weight %, for example, 1 to 10 weight %.

Where the de-protecting agent is acetyl chloride, the acetyl chloride may be present in an amount of 0.5 to 10 weight %, for example, 1 to 5 weight %.

Where the de-protecting agent is piperidine, the piperidine may be present in an amount of 1 to 30 weight %, for example, 5 to 20 weight %.

The de-protecting agent may be dissolved or dispersed in water. The water content of the de-protecting composition may be at least 30 weight %, for example, at least 40 weight %. In some examples, water may be present in an amount of 45 to up to 100 weight %.

In some examples, an additional co-solvent may also be present. In certain examples, a high boiling point co-solvent can be included in the fusing composition. The high boiling point co-solvent can be an organic co-solvent that boils at a temperature higher than the temperature of the powder bed during printing. In some examples, the high boiling point co-solvent can have a boiling point above 250° C. In still further examples, the high boiling point co-solvent can be present at a concentration from about 1 wt % to about 4 wt %.

Classes of co-solvents that can be used can include organic co-solvents including aliphatic alcohols (e.g. $C_1$ to $C_8$ alcohols, for instance, methanol and butanol), aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol. In some examples, methanol may be employed as a co-solvent. In some examples, 1-(2-hydroxyethyl)-2-pyrrolidone may be employed as a co-solvent. In some examples, 2-pyrrolidone may be employed as a co-solvent. In some examples, a combination of methanol and 1-(2-hydroxyethyl)-2-pyrrolidone may be employed as a co-solvent. In some examples, a combination of 2-pyrrolidone and 1-(2-hydroxyethyl)-2-pyrrolidone may be employed as a co-solvent.

The co-solvent content of the de-protecting composition may be 0 to 50 weight %, for example, 10 to 30 weight % of the de-protecting composition.

A surfactant, or combination of surfactants, can also be present in the fusing composition. Examples of surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate. Other examples include anionic disulfonate surfactants having a diphenyl oxide backbone and a pendant alkyl group. Examples include surfactants sold under the tradename Dowfax™ (as supplied by Dow Chemical).

In some examples, the surfactant(s) may be present in an amount of 0 to 3 weight % of the de-protecting composition, for example, 0.1 to 2 weight %.

Various other additives can be employed to optimize the properties of the fusing compositions for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities. Buffers may also be used to control the pH of the composition. Viscosity modifiers may also be present. Such additives can be present at from 0.01 wt % to 20 wt %.

In some examples, the de-protecting composition comprises a de-protecting agent, at least one co-solvent, and water. The de-protecting agent may comprise an amine, an acid or an acid chloride. The co-solvent may comprise 1-(2-hydroxyethyl 2-pyrrolidone. The co-solvent may comprise 1-(2-hydroxyethyl)-2-pyrrolidone and optionally at least one of an alcohol (e.g. $C_1$-$C_6$ alcohol, for instance, methanol or butanol) and 2-pyrrolidone. In some examples, the de-protecting composition further comprises at least one surfactant, at least one sequestering agent and/or at least one buffer.

Fusing Composition

In some examples, a fusing agent may be applied to selected areas of a layer of build material to facilitate coalescing (e.g. fusing) of the build material at the selected areas. For example, a fusing agent may be present in the de-protecting composition. Alternatively, a fusing composition comprising a fusing agent may be applied to selected areas of the layer of build material before or after the de-protecting composition has been printed onto the layer of build material. Where a fusing composition is employed, the fusing composition may form part of the material set of the present disclosure.

The fusing agent may be capable of absorbing electromagnetic radiation to produce heat. The fusing agent can be coloured or colorless. In some examples, the fusing agent can be carbon black, near-infrared absorbing dyes, near-infrared absorbing pigments, tungsten bronzes, molybdenum bronzes, metal nanoparticles, or combinations thereof. Examples of near-infrared absorbing dyes include tetraaryldiamine dyes, cyanine dyes, pthalocyanine dyes, dithiolene dyes, and others. In further examples, the fusing agent can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the fusing agent can have a peak absorption wavelength in the range of 800 nm to 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. The silicates can have the same or similar counterions as the phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

The amount of fusing agent in the fusing composition or de-protecting composition can vary depending on the type of fusing agent. In some examples, the concentration of fusing agent in the fusing or de-protecting composition can be from 0.1 wt % to 20 wt %. In one example, the concentration of fusing agent in the fusing or de-protecting composition can be from 0.1 wt % to 15 wt %. In another example, the concentration can be from 0.1 wt % to 8 wt %. In yet another example, the concentration can be from 0.5 wt % to 2 wt %. In a particular example, the concentration can be from 0.5 wt % to 1.2 wt %.

In some examples, the fusing composition or de-protecting composition can have a black or grey color due to the use of carbon black as the fusing agent. However, in other examples the fusing composition or de-protecting composition can be colorless or nearly colorless. The concentration of the fusing agent can be adjusted to provide a fusing composition or de-protecting composition in which the visible color of the fusing composition or de-protecting composition is not substantially altered by the fusing agent. Although some of the above described fusing agents can have low absorbance in the visible light range, the absorbance is usually greater than zero. Therefore, the fusing agents can absorb some visible light, but their color in the visible spectrum can be minimal enough that it does not substantially impact the fusing composition's ability to take on another color when a colorant is added (unlike carbon black which dominates the ink's color with grey or black tones). The fusing agents in concentrated form can have a visible color, but the concentration of the fusing agents in the fusing composition or de-protecting composition can be adjusted so that the fusing agents may not be present in such high amounts that they alter the visible color of the fusing ink. For example, a fusing agent with a very low absorbance of visible light wavelengths can be included in greater concentrations compared to a fusing agent with a relatively higher absorbance of visible light. These concentrations can be adjusted based on a specific application with some experimentation.

In further examples, the concentration of the fusing agent can be high enough that the fusing agent impacts the color of the fusing ink, but low enough that when the ink is printed on the build material comprising the polymer particles or powder, the fusing agent does not impact the color of the powder. The concentration of the fusing agent can be balanced with the amount of fusing composition or de-protecting composition to be printed on the polymer powder so that the total amount of fusing agent printed onto the polymer powder can be low enough that the visible color of the polymer powder is not impacted. In one example, the fusing agent can have a concentration in the fusing ink such that after the fusing composition or de-protecting composition is printed onto the polymer powder, the amount of fusing agent in the polymer powder is from 0.0003 wt % to 5 wt % with respect to the weight of the polymer powder.

The fusing agent can have a temperature boosting capacity sufficient to increase the temperature of the polymer powder above the melting or softening point of the polymer powder. As used herein, "temperature boosting capacity" refers to the ability of a fusing agent to convert near-infrared light energy into thermal energy to increase the temperature of the printed polymer powder over and above the temperature of the unprinted portion of the polymer powder. The polymer powder particles can be fused together when the temperature increases to the melting or softening temperature of the polymer. As used herein, "melting point" refers to the temperature at which a polymer transitions from a crystalline phase to a pliable, amorphous phase. Some polymers do not have a single melting point, but rather have a range of temperatures over which the polymers soften. This range can be segregated into a lower softening range, a middle softening range, and an upper softening range. In the lower and middle softening ranges, the particles can coalesce to form a part while the remaining polymer powder remains loose. If the upper softening range is used, the whole powder bed can become a cake. The "softening point," as used herein, refers to the temperature at which the polymer particles coalesce while the remaining powder remains separate and loose. When the fusing composition or de-protecting composition is printed on a portion of the polymer powder, the fusing agent can heat the printed portion to a temperature at or above the melting or softening point, while the unprinted portions of the polymer powder remain below the melting or softening point. This allows the formation of a solid 3D printed part, while the loose powder can be easily separated from the finished printed part.

Although melting point and softening point are often described herein as the temperatures for coalescing the polymer powder, in some cases the polymer particles can coalesce together at temperatures slightly below the melting point or softening point. Therefore, as used herein "melting point" and "softening point" can include temperatures slightly lower, such as up to about 20° C. lower, than the actual melting point or softening point.

In one example, the fusing agent can have a temperature boosting capacity from about 10° C. to about 70° C. for a polymer with a melting or softening point from about 100° C. to about 350° C. If the powder bed is at a temperature within about 10° C. to about 70° C. of the melting or softening point, then such a fusing agent can boost the temperature of the printed powder up to the melting or softening point, while the unprinted powder remains at a lower temperature. In some examples, the powder bed can be preheated to a temperature from about 10° C. to about 70° C. lower than the melting or softening point of the polymer. The fusing composition can then be printed onto the powder and the powder bed can be irradiated with a near-infrared light to coalesce the printed portion of the powder.

Where a separate fusing composition is employed, the fusing composition may comprise a liquid vehicle. The fusing agent may be dispersed in the liquid vehicle. In some examples, the liquid vehicle formulation can include water or consist of water.

In some examples, an additional co-solvent may also be present. In certain examples, a high boiling point co-solvent can be included in the fusing composition. The high boiling point co-solvent can be an organic co-solvent that boils at a temperature higher than the temperature of the powder bed during printing. In some examples, the high boiling point co-solvent can have a boiling point above 250° C. In still further examples, the high boiling point co-solvent can be present at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

A surfactant, or combination of surfactants, can also be present in the fusing composition. Examples of surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S 12, Tergitol™ 15-S-7 available from Dow Chemical Company, LEG-1 and LEG-7; Triton™ X-100; Triton™ X-405 available from Dow Chemical Company; and sodium dodecylsulfate.

Various other additives can be employed to optimize the properties of the fusing compositions for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities. Buffers may also be used to control the pH of the composition. Viscosity modifiers may also be present. Such additives can be present at from 0.01 wt % to 20 wt %.

Colorant

In addition to fusing agent, colorant may be applied to the build material. Colorant may be applied to at least the outer surface of the printed part. The colorant may be visible to the naked eye and may be employed in sufficient amounts to impart a discernible colour to the printed part. The colorant may be a visible dye or a visible pigment.

Such colorants may be applied by printing an inkjet ink composition comprising a colorant onto the build material. The colored inkjet ink may be provided as part of the material set of the present disclosure. The colored inkjet ink may be applied to at least portions of a layer of unfused polymer particles to impart colour to the printed part. A colored inkjet ink can include any suitable colorant, including dyes and/or pigments. This can allow for printing of full-color 3-dimensional parts. Suitable inkjet inks include cyan, magenta, yellow, and black inks. Coloured inkjet ink compositions may be provided together with the build material, dopant composition and fusing composition as part of the 3-dimensional printing material set.

Alternatively or additionally, colorants may be incorporated into the fusing composition described above. In some examples, the colorant can be present in an amount from 0.5 wt % to 10 wt % in the compositions. In one example, the colorant can be present in an amount from 1 wt % to 5 wt %. In another example, the colorant can be present in an amount from 5 wt % to 10 wt %.

In some examples, the colorant can be a dye. The dye may be nonionic, cationic, anionic, or a mixture of nonionic, cationic, and/or anionic dyes. Specific examples of dyes that may be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

In other examples, the colorant can be a (e.g. visible) pigment. The pigment can be self-dispersed with a polymer, oligomer, or small molecule; or can be dispersed with a separate dispersant. Suitable pigments include, but are not limited to, the following pigments available from BASF: Paliogen®) Orange, Heliogen® Blue L 6901F, Heliogen®) Blue NBD 7010, Heliogen® Blue K 7090, Heliogen® Blue L 7101F, Paliogen®) Blue L 6470, Heliogen®) Green K 8683, and Heliogen® Green L 9140. The following black pigments are available from Cabot Monarch®1400, Monarch® 1300, Monarch®) 1100, Monarch®1000, Monarch®) 900, Monarch® 880, Monarch® 800, and Monarch®) 700. The following pigments are available from CIBA: Chromophtal®) Yellow 3G, Chromophtal®) Yellow GR, Chromophtal®) Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Degussa: Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure®) R-101. The following pigments are available from Heubach: Dalamar® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast@ Violet. The following pigments are available from Sun Chemical: L74-1357 Yellow, L75-1331 Yellow, and L75-2577 Yellow. The following pigments are available from Columbian: Raven® 7000, Raven®5750, Raven® 5250, Raven® 5000, and Raven® 3500. The following pigment is available from Sun Chemical: LHD9303 Black. Any other pigment and/or dye can be used that is useful in modifying the color of the above described inks and/or ultimately, the printed part.

EXAMPLES

Example 1—Protection of 11-Aminoundecanoic Acid

11-Aminoundecanoic acid (97%, 955 mg, 4.6 mmol) and bicarbonate (773 mg, 9.2 mmol) were dispersed in a mixture of DI-water (13 mL) and dioxane (8.4 mL). The dispersion was cooled in an ice bath and di-tert-butyl dicarbonate (30% in dioxane, 3.6 mL, 5.1 mmol) were slowly added. The reaction mixture was stirred while cooled in an ice bath for one hour, after this the ice bath was removed and the mixture was stirred at room temperature overnight. The mixture was then diluted with 20 mL of water, transferred into a separatory funnel and the aqueous mixture was twice extracted with ethyl acetate. The organic layers were then extracted with aqueous bicarbonate solution (ca. 0.1 M). Finally, all aqueous layers were combined and adjusted to pH 1 through the addition of hydrochloric acid. The solution was transferred into a separatory funnel and extracted with ethyl acetate. The organic phase was separated and dried with anhydrous sodium sulfate.

Figure 1:
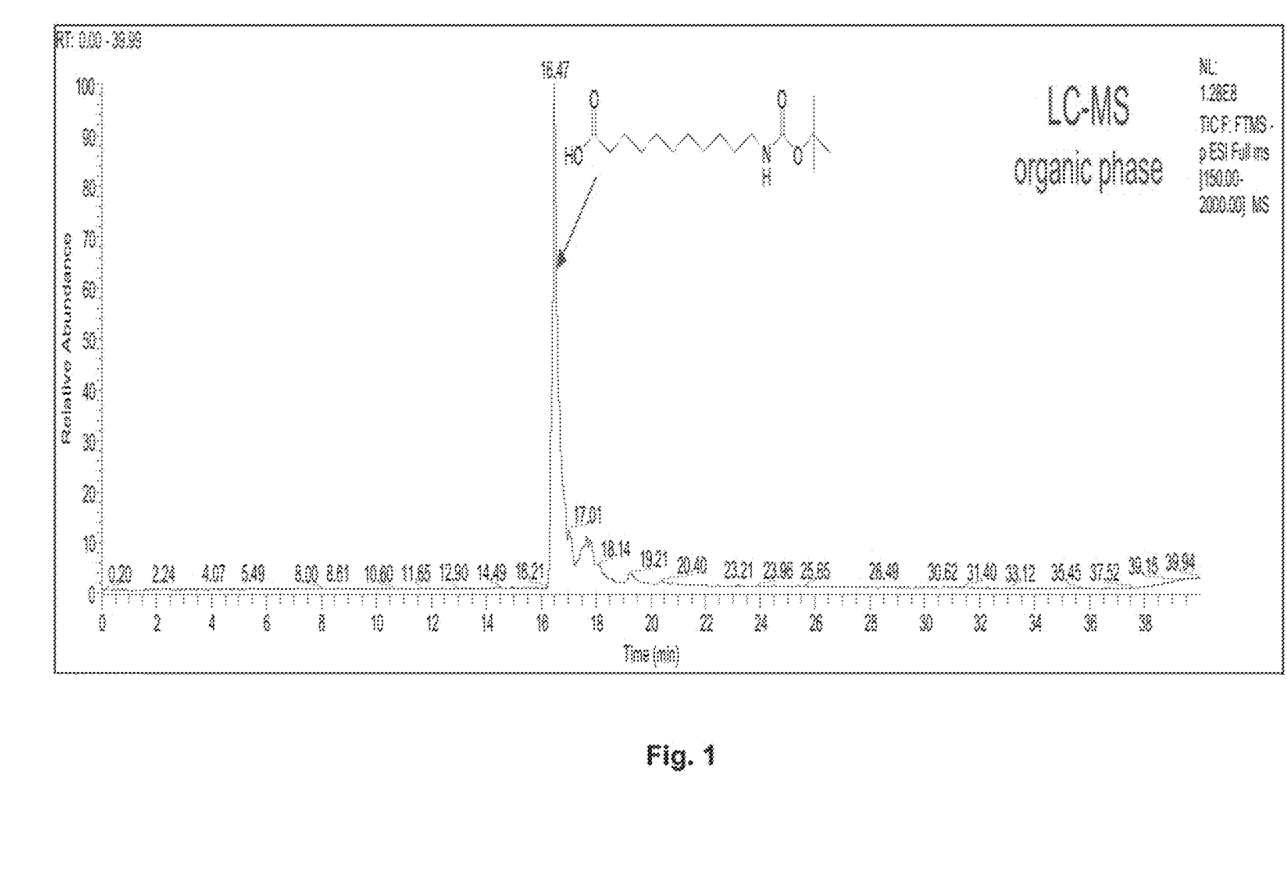
FIG. 1 is a liquid-chromatography mass spectrum of a protected compound formed in Example 1.

LC-MS analysis confirmed the formation of tert-butoxycarbonyloximino undecanoic acid (FIG. 1).

Example 2—Deprotection of Tert-Butoxycarbonyloximino Undecanoic Acid

Figure 2:
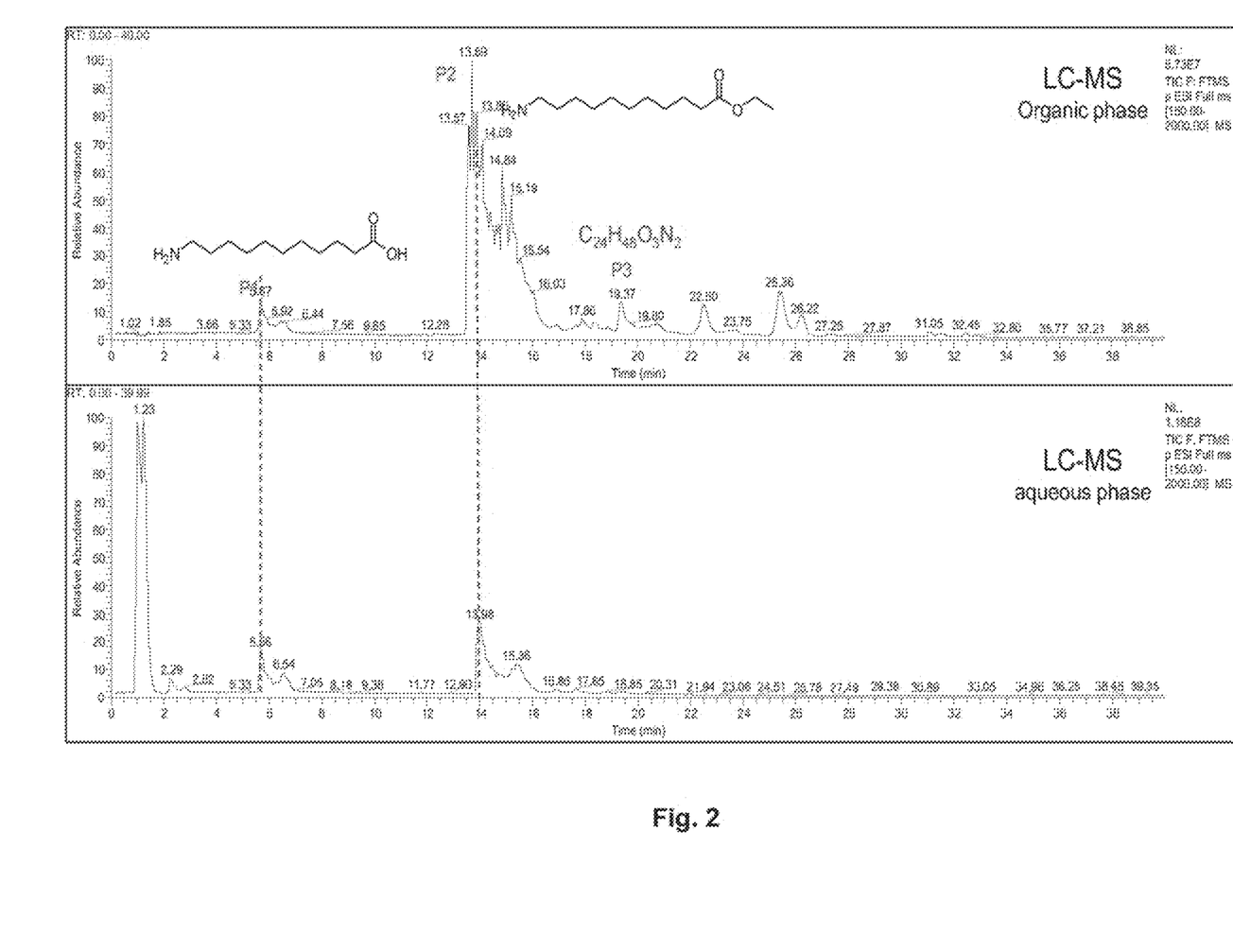
FIG. 2 is a liquid-chromatography mass spectrum of a de-protected compound formed in Example 2.

Hydrochloric acid (37%, 2 mL) was added to the solution of tert-butoxycarbonyloximino undecanoic acid in ethyl acetate from the previous reaction step. The mixture was stirred at room temperature overnight and subsequently neutralized by the addition of aqueous bicarbonate solution. From the LC-MS data in FIG. 2, it can be seen that the protected compound was de-protected in both aqueous and organic phases.

The invention claimed is:

1. A method of 3-D printing, comprising:
   a. applying a layer of build material onto a print platform, wherein the build material comprises particles of a polymer comprising polymer chains having at least one reactive group that is protected with a protecting group,
   b. printing a de-protecting agent at selected locations on the layer of build material, and
   c. coalescing particles of the polymer at the printed locations on the layer of build material to form a coalesced polymer layer.

2. The method as claimed in claim 1, which further comprises:
   d. separating particles of the polymer from the coalesced polymer layer,
   e. applying at least some of the separated particles over the coalesced polymer layer as a further layer of build material,
   f. printing the de-protecting agent at selected locations on the further layer of build material,
   g. coalescing particles of the polymer at the printed locations on the further layer of build material to form a further coalesced polymer layer; and
   h. optionally repeating steps d) to g).

3. The method as claimed in claim 1, wherein the de-protecting agent is printed by inkjet printing.

4. The method as claimed in claim 1, wherein the at least one reactive group comprises at least one amino, carboxyl and/or hydroxyl group that is protected with the protecting group.

5. The method as claimed in claim 4, wherein the polymer is a polyamide or polyester.

6. The method as claimed in claim 5, wherein:
   the polymer is a polyamide that comprises a terminal amide group that comprises an amino group that is protected with a protecting group and/or a terminal carboxylic acid group that comprises carboxyl group that is protected with a protecting group; or
   the polymer is a polyester that comprises a terminal hydroxyl group that is protected with a protecting group and/or a terminal carboxylic acid group that comprises a carboxyl group protected with a protecting group.

7. The method as claimed in claim 1, wherein the polymer chains have at least one protected amino group that is selected from at least one of 9-fluorenylmethyl carbamate, t-butyl carbamate, benzyl carbamate, acetamide, trifluoroacetamide, phthalimide, benzylamine, triphenylmethylamine, benzylideneamine, p-toluenesulfonamide.

8. The method as claimed in claim 1, wherein the polymer chains have at least one protected carboxylic acid group that is selected from a methyl ester, t-butyl ester, benzyl ester, S-t-butyl ester and 2-alkyl-1,3-oxazoline.

9. The method as claimed in claim 1, wherein the polymer chains have at least one protected hydroxyl group that is selected from methoxymethyl ether, tetrahydropyranyl ether, t-butyl ether, allyl ether, benzyl ether, t-butyldimethylsilyl ether, t-butyldiphenylsilyl ether, acetic acid ester, pivalic acid ester and benzoic acid ester.

10. The method as claimed in claim 1, wherein the particles of the polymer have an average particle size of 10 to 100 μm and a melting point from 80 to 400 degrees C.

11. The method as claimed in claim 3, wherein:
    the de-protecting agent is for de-protecting a protected amino, hydroxyl, carboxyl and/or carbonyl group, and
    the de-protecting agent is included with water in an inkjet de-protecting composition.

12. The method as claimed in claim 11, wherein the deprotecting agent is selected from a Bronsted/Lewis acid, base, electrophile, or nucleophile.

13. The method composition as claimed in claim 11, wherein the inkjet de-protecting composition comprises 0.5 to 30 weight % of the de-protecting agent.

* * * * *